(12) United States Patent
Okai et al.

(10) Patent No.: US 7,331,413 B2
(45) Date of Patent: Feb. 19, 2008

(54) FRONT-END STRUCTURE OF VEHICLE

(75) Inventors: Harumi Okai, Kariya (JP); Toshiki Sugiyama, Kariya (JP); Ikuo Ozawa, Toyoake (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/385,344

(22) Filed: Mar. 10, 2003

(65) Prior Publication Data
US 2004/0084236 A1    May 6, 2004

(30) Foreign Application Priority Data
Mar. 11, 2002  (JP)  ............................. 2002-065459
Oct. 1, 2002   (JP)  ............................. 2002-288992

(51) Int. Cl.
*B60K 11/04* (2006.01)
(52) U.S. Cl. ............... 180/68.4; 180/68.1; 296/193.09; 296/203.02
(58) Field of Classification Search ............... 180/68.4, 180/68.6, 68.1, 299, 311; 296/194, 30, 203.02, 296/196, 230.02, 193.09, 193.01
See application file for complete search history.

(56) References Cited

U.S. PATENT DOCUMENTS

| | | | | |
|---|---|---|---|---|
| 4,579,184 | A  * | 4/1986  | Hiramoto    | 180/68.4 |
| 5,066,057 | A  * | 11/1991 | Furuta et al. | 293/121 |
| 5,271,473 | A  * | 12/1993 | Ikeda et al. | 180/68.4 |
| 5,409,288 | A  * | 4/1995  | Masuda      | 296/193.09 |
| 6,216,810 | B1 * | 4/2001  | Nakai et al. | 180/68.4 |
| 6,260,609 | B1 * | 7/2001  | Takahashi   | 180/68.4 |
| 6,364,403 | B1   | 4/2002  | Ozawa et al. | |
| 6,412,581 | B2 * | 7/2002  | Enomoto et al. | 180/68.4 |
| 6,447,049 | B1 * | 9/2002  | Tohda et al. | 296/180.1 |
| 6,516,906 | B2 * | 2/2003  | Sasano et al. | 180/68.4 |

(Continued)

FOREIGN PATENT DOCUMENTS

| | | | |
|---|---|---|---|
| JP | 06-286657    | * | 10/1994 |
| JP | 11-099964    | * | 4/1999  |
| JP | 3085945      |   | 7/2000  |
| JP | 2001-187588  | * | 7/2001  |
| JP | 2002-019641  | * | 1/2002  |

OTHER PUBLICATIONS

Office Action dated Mar. 27, 2007 in Japanese Application No. 2002-288992 with English translation.*

*Primary Examiner*—Hau Phan
(74) *Attorney, Agent, or Firm*—Harness, Dickey & Pierce, PLC

(57) ABSTRACT

An attachment portion between an upper member (11) and a radiator (20) is constructed so as to be displaced in a longitudinal direction of the upper member (11) when an impact force is applied to the upper member (11) by constructing a mount cushion (30) so as to be deformed easily in a longer diameter direction thereof. By this structure, when an impact force is applied to the upper member (11) from a front side of a vehicle, as it is not that the radiator (20) and the upper member (11) are deformed together but that the upper member (11) is deformed prior to the radiator (20), a bending rigidity to an impact force becomes smaller than a conventional case. Consequently, since the upper member is allowed to be deformed easily at the time of collision without largely reducing the mechanical strength of the upper member (11), compatibility between the requirements of protection of pedestrians and sufficient strength of the upper member (11) can be ensured.

12 Claims, 14 Drawing Sheets

U.S. PATENT DOCUMENTS

| | | | |
|---|---|---|---|
| 6,578,650 B2 * | 6/2003 | Ozawa et al. | 180/68.1 |
| 6,622,808 B2 * | 9/2003 | Sasano et al. | 180/68.6 |
| 6,672,652 B2 * | 1/2004 | Takeuchi et al. | 296/193.09 |
| 6,685,258 B2 * | 2/2004 | Brogly et al. | 296/203.02 |
| 6,708,790 B2 * | 3/2004 | Ozawa et al. | 180/68.4 |
| 6,729,424 B2 * | 5/2004 | Joutaki et al. | 180/68.4 |
| 6,729,681 B2 * | 5/2004 | Yustick | 296/193.01 |
| 7,108,092 B2 * | 9/2006 | Suwa et al. | 180/68.4 |

* cited by examiner

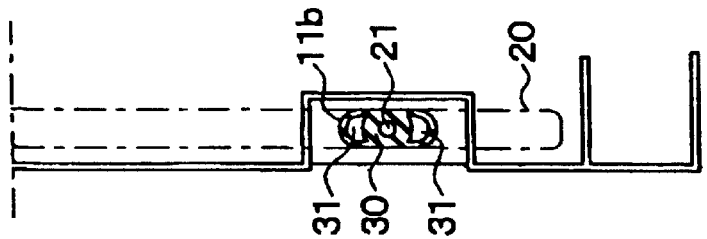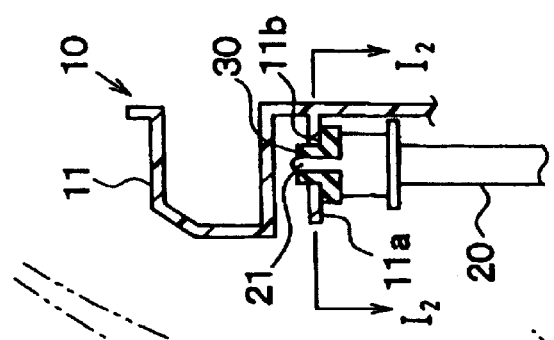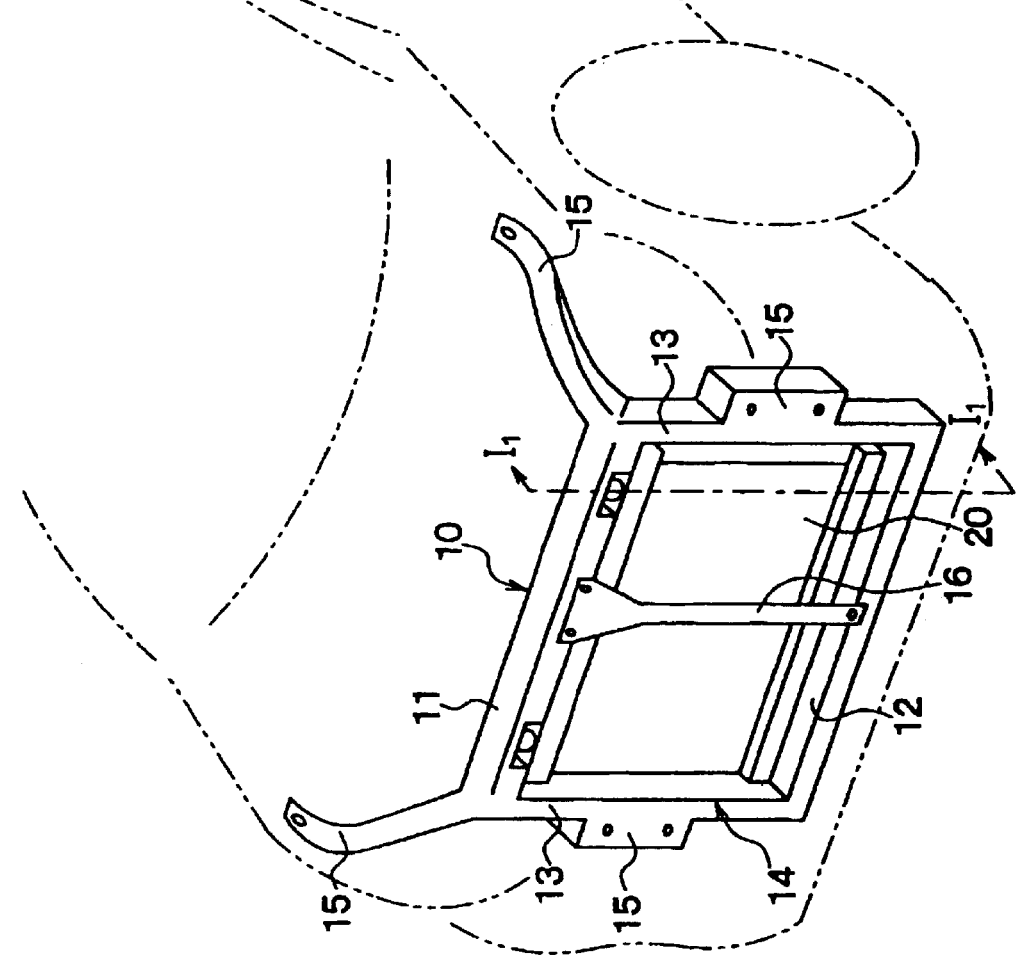

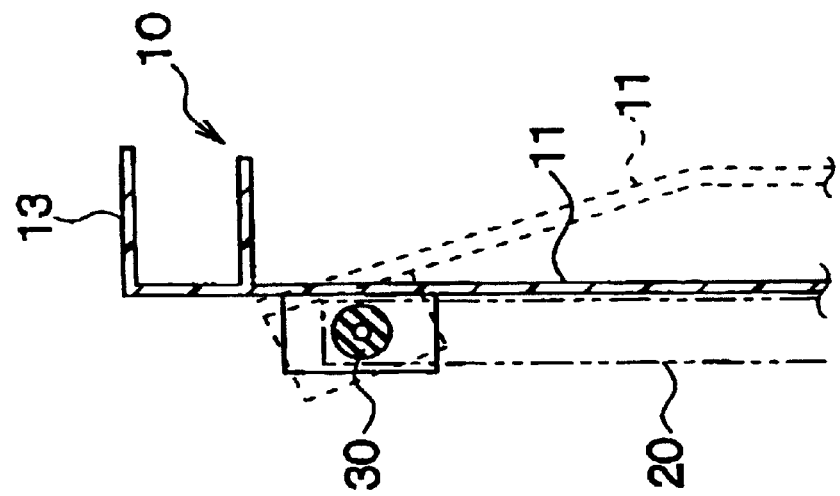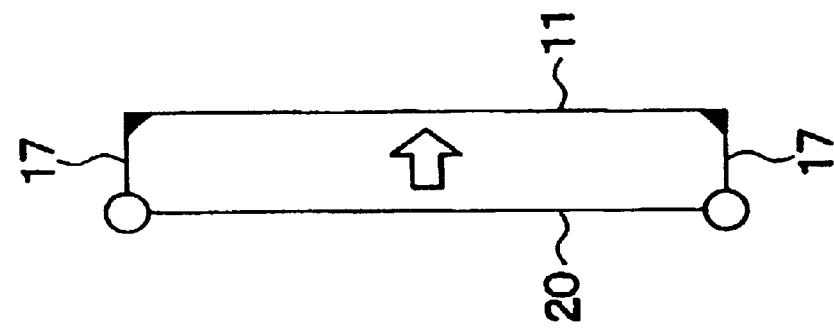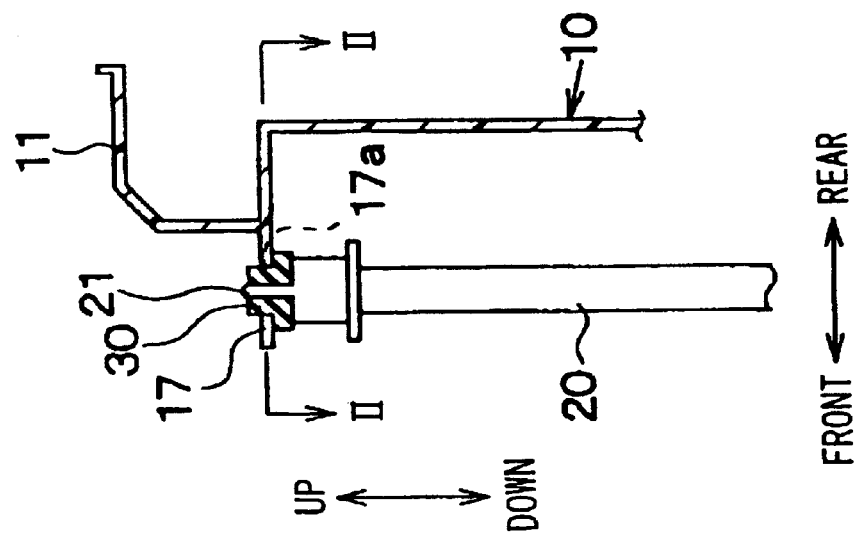

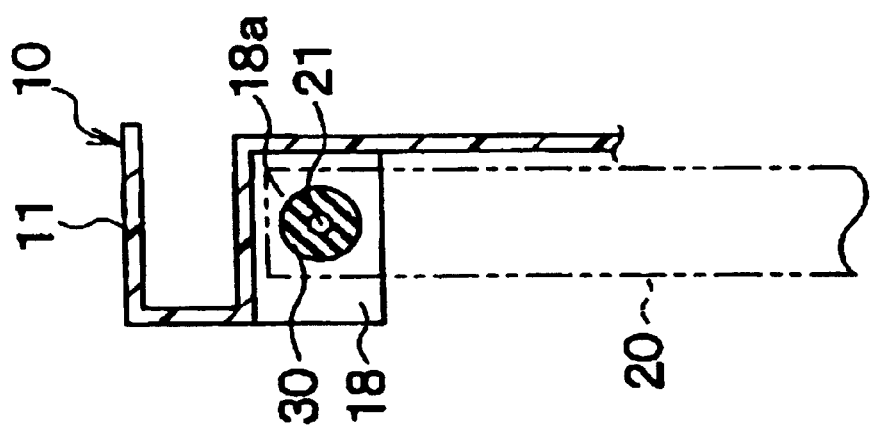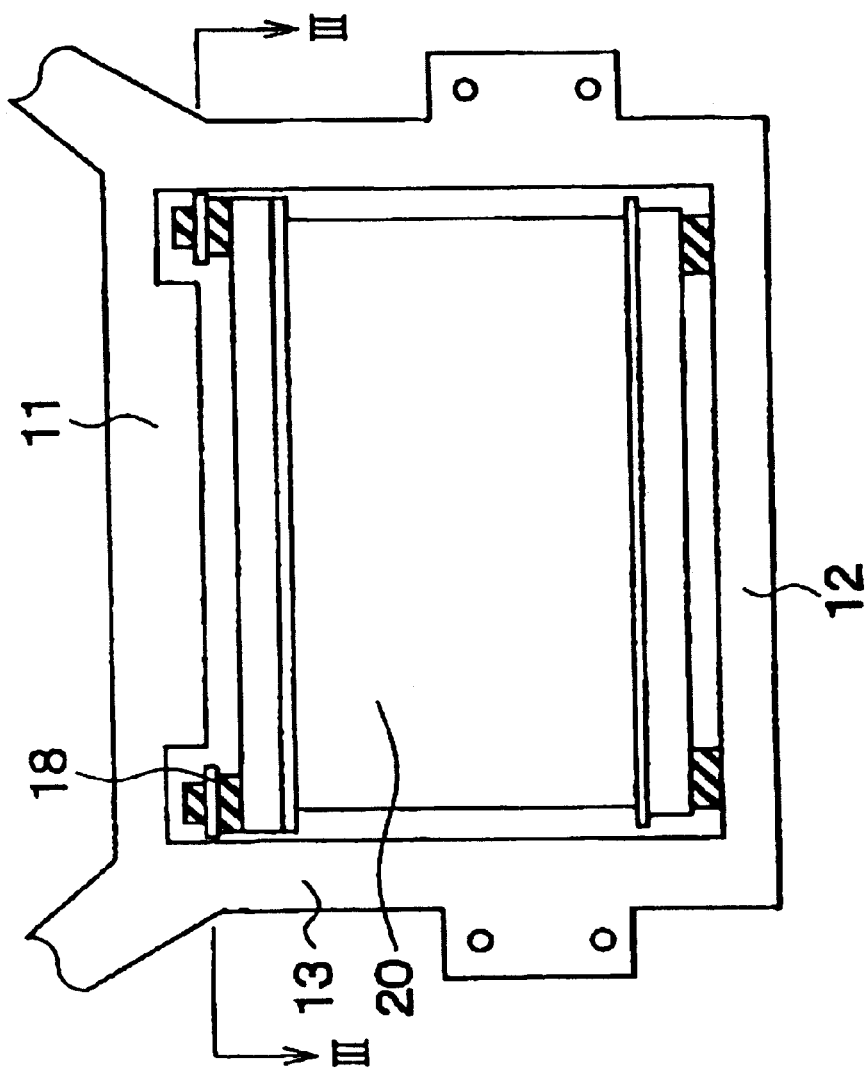

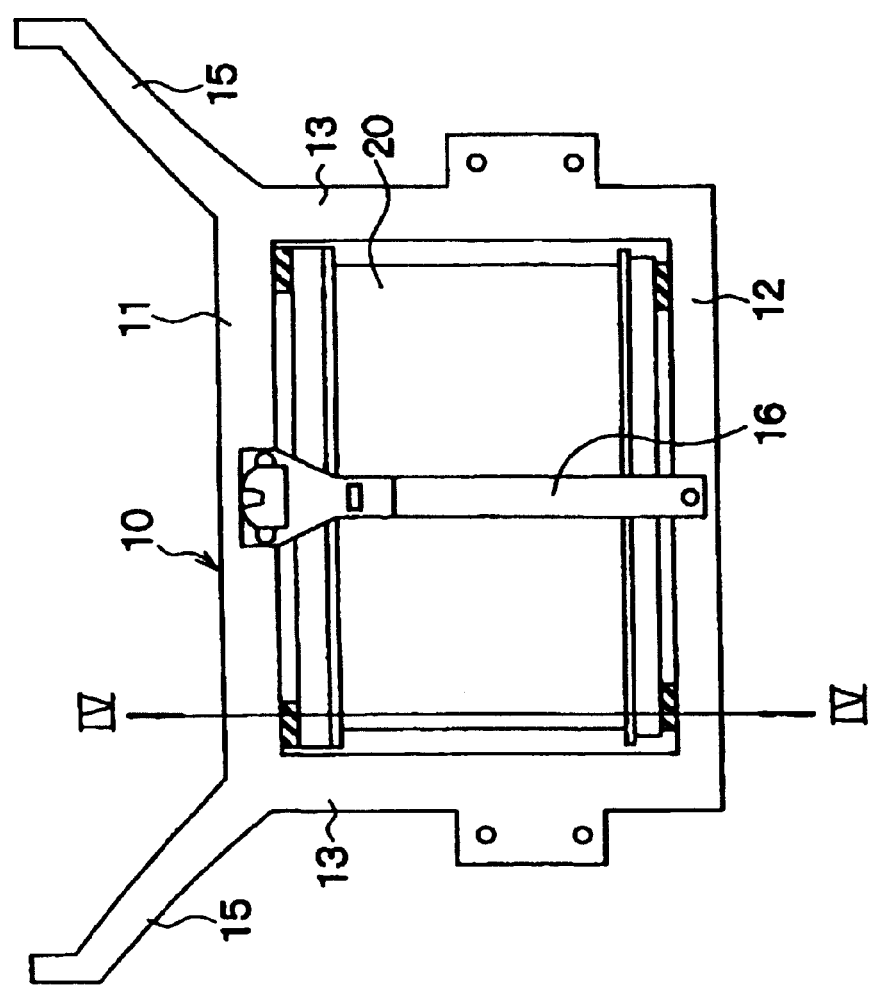
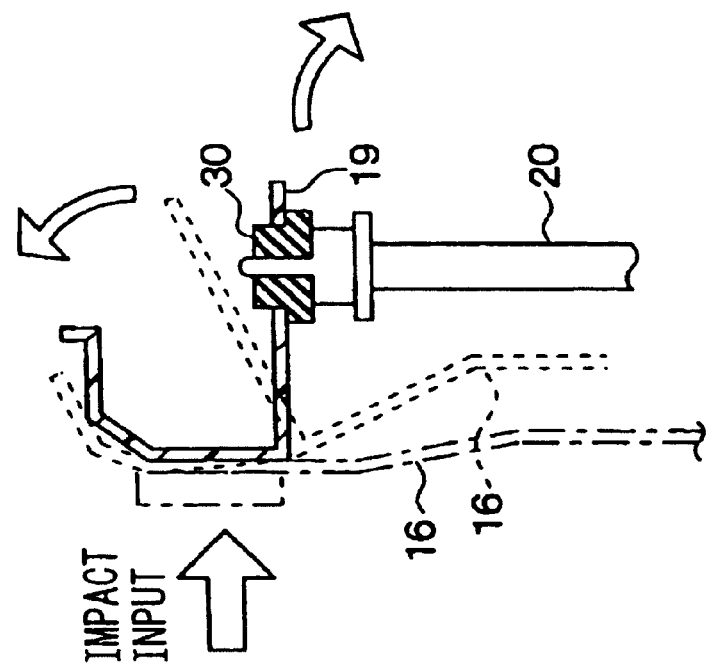
Fig.4A
Fig.4B

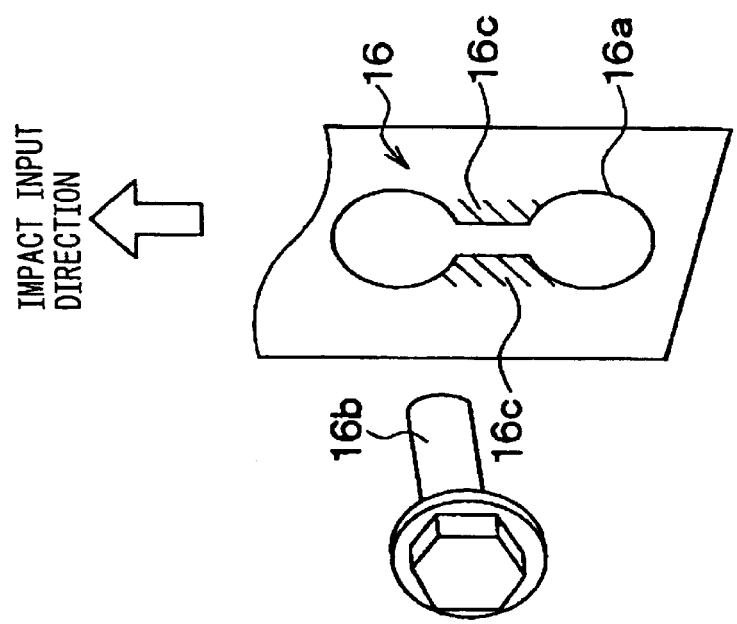
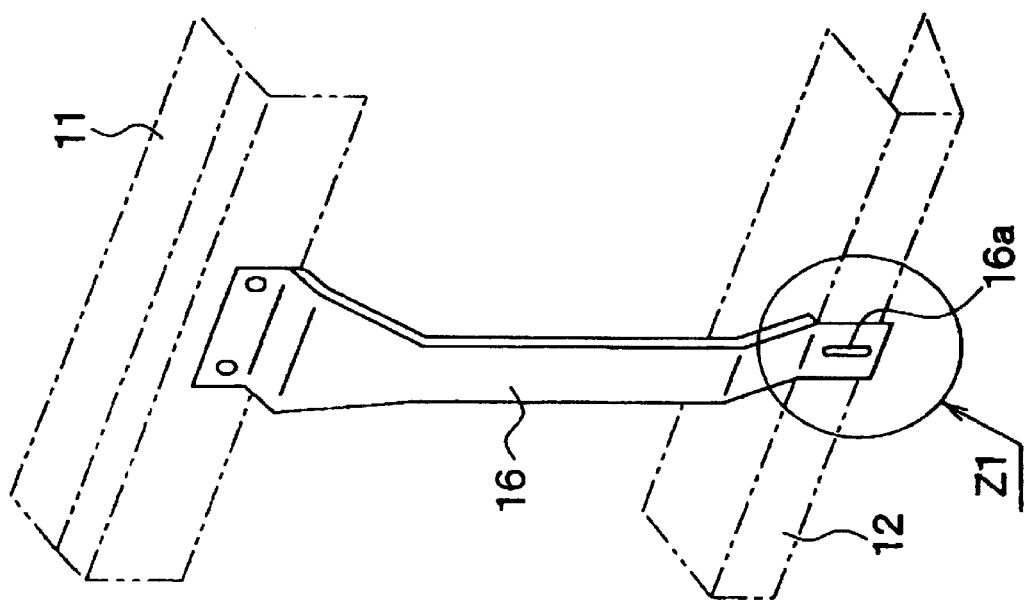
Fig.5A
Fig.5B

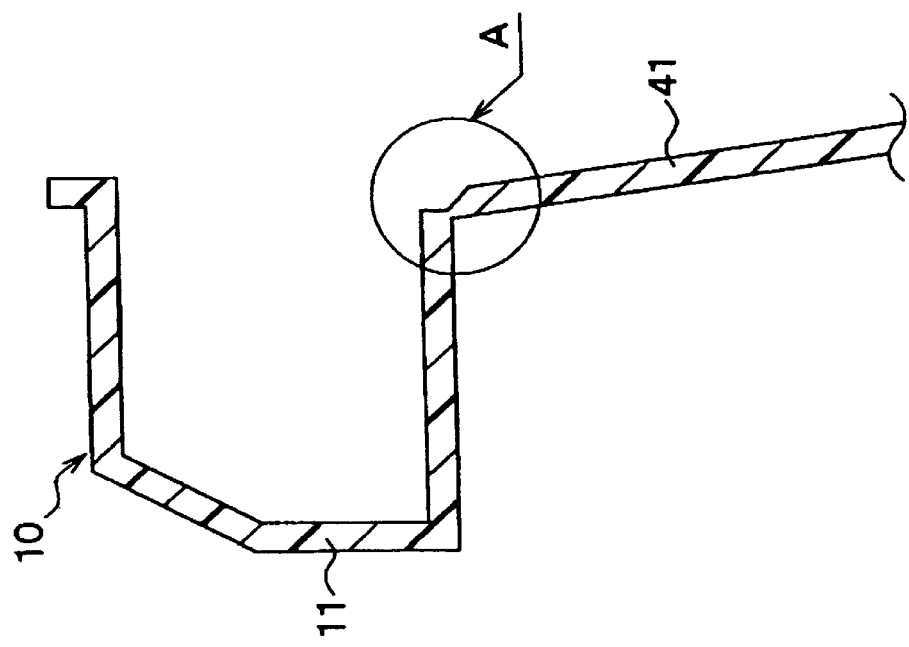
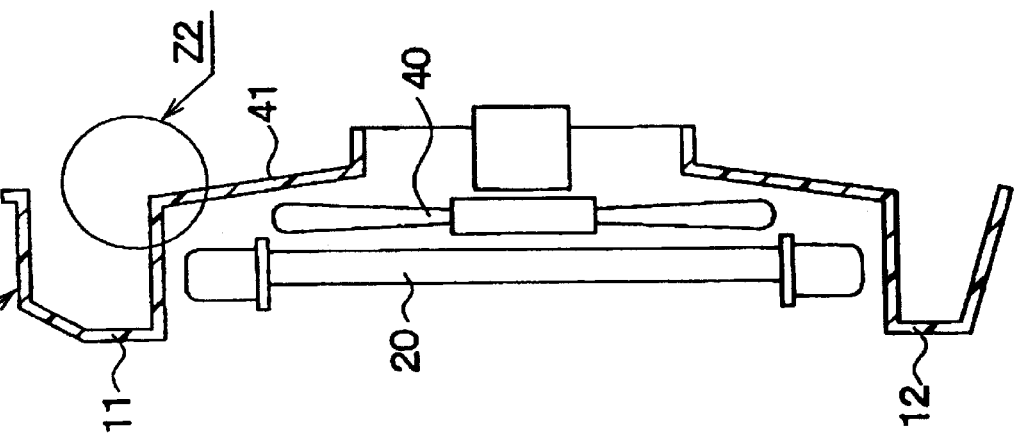

FRONT-END STRUCTURE OF VEHICLE

FIELD OF THE INVENTION

The present invention relates to a front-end structure of a vehicle.

DESCRIPTION OF THE RELATED ART

Normally, a radiator is fixed to a vehicle body via a radiator support. Here, the radiator support is a so-called carrier or front end panel which is constructed to include a rectangular frame unit made up of a beam-like upper member extending in a transverse direction of the vehicle, a beam-like lower member extending in the transverse direction of the vehicle below the upper member and side members extending vertically so as to connect longitudinal ends of the upper member with longitudinal ends of the lower members, and fixing portions for fixing the rectangular frame unit to the vehicle body.

Incidentally, in recent years, a front-end structure has been in demand which can reduce the injury to a pedestrian in the event he or she is hit by a vehicle.

To meet this demand, the mechanical strength of the upper member which is most likely to injure a pedestrian at the time of collision only has to be reduced, but as, for example, a hood lock for securing an engine hood is attached to the upper member, in case the mechanical strength of the upper member is reduced simply, there is a risk that there may not be sufficient mechanical strength to assure the attachment of the hood lock.

Here, sufficient mechanical strength to ensure attachment of the engine hood means an attachment strength which keep the engine hood closed against wind pressure when the vehicle is running. In this connection, since the engine hood has a relatively wide area and the wind pressure which could open the engine hood increases with the vehicle speed, a very large force is applied to the engine hood and the hood lock when the vehicle is running at high speed.

It should be noted that FIG. 15 shows the results of tests showing displacement and acceleration of the head of a pedestrian when the pedestrian is hit by a vehicle, and as is shown from the results of tests, the larger the displacement of the head, the more the impact applied to the pedestrian can be reduced.

SUMMARY OF THE INVENTION

In view of the above, an object of the present is to improve the protection of pedestrians and securement of a required strength of the upper member in a compatible fashion.

With a view to attaining this object, according to a first aspect of the prevent invention, there is provided a front-end structure of a vehicle comprising a radiator support (10) fixed to a vehicle body at a front-end part of the vehicle and having at least a beam-like upper member (11) extending in a transverse direction of the vehicle, and a radiator (20) assembled to the radiator support (10), wherein when an impact is applied to the upper member (11) from a front side of the vehicle, the upper member (11) is constructed to be deformed prior to the radiator (20).

Thus, since the impact force applied to a pedestrian when hit by a vehicle can be absorbed sufficiently, compatibility between the requirements of protection of pedestrians and sufficient strength of the upper member (11) can be ensured.

According to another aspect of the present invention, there is provided a front-end structure of a vehicle comprising a radiator support (10) fixed to a vehicle body at a front-end part of the vehicle and having at least a beam-like upper member (11) extending in a transverse direction of the vehicle, and a radiator (20) held on an upper side thereof to an upper member side, wherein an attachment portion between the upper member (11) and the radiator (20) is constructed to be displaced relative to a longitudinal direction of the upper member (11).

Thus, since it is not the radiator (20) and the upper member (11) that are deformed together but the upper member (11) that is deformed prior to the radiator (20) when an impact is applied to the upper member (11) from the front side of the vehicle, the bending rigidity to the impact becomes smaller than a conventional case.

As this occurs, since most of the force applied to a hood lock from an engine hood is applied vertically to the upper member (11), whereas most of the impact force is applied horizontally to the upper member (11), the mechanical strength of the upper member (11) is not largely reduced, and since the upper member (11) is easily deformed at the time of collision, compatibility of protection of pedestrians and sufficient between the requirements strength of the upper member (11) can be ensured.

In addition, according to the present invention, the radiator (20) is held to the upper member (11) side via a mount cushion (30) which can be deformed in the longitudinal direction of the upper member (11).

Additionally, according to the present invention, a hole (11b) in which the mount cushion (30) is inserted for installation is provided on the upper member (11) side, and wherein the hole (11b) is formed in an elongated hole shape in which the longitudinal direction of the upper member (11) constitutes a longer diameter direction.

In addition, according to the present invention, a deformation promoting portion (31) is provided on the mount cushion (30) for facilitating the deformation of the mount cushion (30)in the longitudinal direction of the upper member (11).

According to a further aspect of the present invention, there is provided a front-end structure of a vehicle comprising a radiator support (10) fixed to a vehicle body at a front-end part of the vehicle and having at least a beam-like upper member (11) extending in a transverse direction of the vehicle, and a radiator (20) held on an upper side thereof at a position which deviates in a longitudinal direction of the vehicle relative to the upper member (11) of the radiator support (10).

Thus, the upper member (11) takes a portal rigid-frame construction relative to the radiator (20) as viewed from the top (refer to FIG. 2B, which will be described later on).

In contrast, according to the conventional structure, as an attachment portion of the radiator does not deviate in the longitudinal direction of the vehicle relative to the upper member, the radiator and the upper member constitutes a single simple beam construction as viewed from the top.

Consequently, as the present invention provides a structure which flexes and deforms more than the conventional structure, that is, which has a smaller bending rigidity in relation to an impact than that of the conventional structure, the upper member (11) is deformed easily at the time of collision without significantly reducing the mechanical strength of the upper member (11). Thus, compatibility between the requirements of protection of pedestrians and sufficient strength of the upper member (11) can be ensured.

In addition, according to the present invention, the radiator (20) is held to the radiator support (10) via a resiliently deformable mount cushion (30), wherein the mount cushion

(30) is inserted in a hole (17a) formed in the radiator support (10) for installation therein, and furthermore wherein an opening shape of the hole (17a) and an external shape of the mount cushion (30) as viewed from the top are circular.

Thus, when the upper member (11) is deformed, the attachment portion of the radiator (20) to the radiator support (10) is able to rotate easily, and therefore the bending rigidity to an impact force can be reduced in an ensured fashion when compared with the conventional structure.

According to a further aspect of the present invention, there is provided a front-end structure of a vehicle comprising a radiator support (10) fixed to a vehicle body at a front-end part of the vehicle and having at least a beam-like upper member (11) extending in a transverse direction of the vehicle, a beam-like lower member (12) extending in the transverse direction of the vehicle below the upper member and side members (13) extending vertically so as to connect longitudinal ends of the upper member (11) with longitudinal ends of the lower members (12), and a radiator (20) held on an upper side thereof by the side members (13).

Thus, the upper member (11) and the radiator (20) are do not deform together, and the bending rigidity to an impact force is equal to the bending rigidity of the upper member (11) alone.

Consequently, since the bending rigidity to an impact force is reduced when compared with the conventional structure in which the radiator and the upper member deform together, the upper member (11) is easily deformed at the time of collision without significantly reducing the mechanical strength of the upper member (11), whereby the compatibility between the requirements of protection of pedestrians and sufficient strength the upper member (11) can be ensured.

In addition, according to the present invention, an upper side of the radiator (20) is held to the side members (13) via a resiliently deformable mount cushion (30), wherein the mount cushion (30) is inserted in a hole (18a) formed in a bracket portion (18) provided on the side member (13), and furthermore wherein an opening shape of the hole (18a) and an external shape of the mount cushion (30), as viewed from the top, are circular.

Thus, the attachment portion of the radiator (20) to the radiator support (10) is able to rotate easily, and compared with the conventional structure, the bending rigidity to the impact force can be assuredly reduced.

According another aspect of the present invention, there is provided a front-end structure of a vehicle comprising a radiator support (10) fixed to a vehicle body at a front-end part of the vehicle and having at least a beam-like upper member (11) extending in a transverse direction of the vehicle, a radiator (20) held at least on an upper side thereof at the radiator support (10), a bracket portion (19) constructed to hold the upper side of the radiator (20) at a position which deviates in a longitudinal direction of the vehicle relative to the upper member (11) and to release the radiator (20) from a held condition when displaced upwardly, and a brace (16) for transmitting to the bracket portion (19) a force which can displace the bracket portion (19) upwardly upon receiving an impact force from the front side.

Thus, since the upper member (11) can be easily deformed at the time of collision without significantly reducing the mechanical strength of the upper member (11), compatibility between the requirements of protection of pedestrians and sufficient strength of the upper member (11) can be ensured.

According to a further aspect of the present invention, there is provided a front-end structure of a vehicle comprising a radiator support (10) fixed to a vehicle body at a front-end part of the vehicle and having at least a beam-like upper member (11) extending in a transverse direction of the vehicle and a beam-like lower member (12) extending in the transverse direction of the vehicle below the upper member (11), and a brace (16) extending vertically to connect the upper member (11) with the lower member (12), wherein the brace (16) has provided thereon extension permissive portions (16a, 16c) for permitting a distance between the upper member (11) and the lower member (12) to extend when an external force equal to or larger than a predetermined magnitude is applied thereto.

Thus, since the distance between the upper member (11) and the lower member (12) can easily be extended at the time of collision, the upper member (11) is easily deformed in a colliding direction at the time of collision without significantly reducing the mechanical strength of the upper member (11), compatibility between the requirements of the protection of pedestrians and sufficient strength of the upper member (11) can be ensured.

According to a further aspect of the present invention, there is provided a front-end structure of a vehicle comprising a radiator support (10) fixed to a vehicle body at a front-end part of a vehicle and having at least a beam-like upper member (11) extending in a transverse direction of the vehicle and a beam-like lower member (12) extending in the transverse direction of the vehicle below the upper member (11), and a brace (16) extending vertically to connect the upper member (11) with the lower member (12), wherein at least one of a connecting portion between the brace (16) and the upper member (11) and a connecting portion between the brace (16) and the lower member (12) is connected by inserting a bolt (16b) in an elongated hole (16a) having a longer diameter dimension in a vertical direction, and furthermore wherein a projecting portion (16c) is provided so as to partition the elongated hole (16a) in a longer diameter direction.

Thus, since the projecting portion (16c) collapses when an impact force is applied to the brace (16), whereby the bolt (16b) is allowed to move to a lower end side relative to the elongated hole (16a), the distance between the upper member (11) and the lower member (12) can easily be extended at the time of collision.

Consequently, since the upper member (11) is easily deformed at the time of collision without significantly reducing the mechanical strength of the upper member (11), compatibility between the requirements of the protection of pedestrians and sufficient strength of the upper member (11) can be ensured.

According to another aspect of the invention, there is provided a front-end structure of a vehicle comprising a radiator support (10) in which a beam-like upper member (11) extending in a transverse direction of the vehicle and a shroud (41) adapted to cover a gap between a radiator (20) and a blower (40) so as to prevent an air flow induced by the blower (40) from bypassing the radiator (20) to flow are integrated with each other, wherein the mechanical strength of a connecting portion between the upper member (11) and the shroud (41) is less than any other location.

Thus, since the upper member (11) is easily deformed in a colliding direction at the time of collision without significantly reducing the mechanical strength of the upper member (11), compatibility between the requirements of the protection of pedestrians and sufficient strength of the upper member (11) can be ensured.

According to a further aspect of the invention, there is provided a front-end structure of a vehicle comprising a radiator support (10) having at least a beam-like upper member (11) extending in a transverse direction of the vehicle and to which a radiator (20) is assembled, wherein the bending rigidity reducing structure is provided for reducing the horizontal bending rigidity of the upper member (11).

Thus, since the upper member (11) is easily deformed in a colliding direction at the time of collision without significantly reducing the mechanical strength of the upper member (11), compatibility between the requirements of the protection of pedestrians and sufficient strength of the upper member (11) can be ensured.

In addition, according to the present invention, a rigidity enhancing structure is provided for enhancing the vertical bending rigidity of the upper member.

Thus, since the upper member (11) is easily deformed in a colliding direction at the time of collision without significantly reducing the mechanical strength of the upper member (11), compatibility between the requirements of the protection of pedestrians and sufficient strength of the upper member (11) can be ensured.

Additionally, according to the present invention, the rigidity reducing structure is constructed by providing a notched portion (11c) on a vehicle front side of the upper member (11).

Furthermore, according to the present invention, the rigidity reducing structure is constructed by providing a thin portion (11f) which is thinner than any other location on the vehicle front side of the upper member (11).

In addition, according to the present invention, the rigidity enhancing portion is constructed by providing a connecting member (11d) for connecting an upper interior wall and a lower interior wall of the upper member (11).

Additionally, according to the present invention, the connecting member (11d) is provided on an interior portion of the upper member (11) so as to extend to the rear of the vehicle from a location which deviates a predetermined dimension from a front end portion of the vehicle toward the rear of the vehicle.

According to a further aspect of the present invention, there is provided a front-end structure of a vehicle comprising a radiator support (10) having a beam-like upper member (11) having at least a substantially U-shaped cross section and a shroud (41) constructed to cover a gap between a radiator (20) and a blower (40) so as to prevent an air flow induced by the blower (40) from bypassing the radiator (20) to flow, part (41a) of the fan shroud (41) making up part of the upper member (11), wherein the upper member (11) is disposed at a more rearward position of the vehicle than the radiator (20).

Thus, since a sufficient collapsing margin for absorbing an impact force applied to a pedestrian when hit by a vehicle can be secured, compatibility between the requirements of the protection of pedestrians and sufficient strength of the upper member (11) can be ensured.

It should be noted that according to the present invention, the upper member (11) and the shroud (41) are formed from resin to be integrated with each other.

In addition, according to the present invention, a hood lock (50) for securing an engine hood is provided on the upper member (11).

Thus, since an impact force is transmitted to the upper member (11) disposed rearward of the radiator (20), a displacement of the upper member (11) becomes larger than in a case where an impact force is received by both the radiator (20) and the upper member (11).

Consequently, since a sufficient collapsible margin for absorbing an impact force applied to a pedestrian when hit by a vehicle can be secured, compatibility between the requirements of the protection of pedestrians and sufficient strength required of the upper member (11) can be ensured.

According to another aspect of the invention, there is provided a front-end structure of a vehicle comprising a radiator support (10) fixed to a vehicle body at a front-end part of the vehicle and having at least a beam-like upper member (11) extending in a transverse direction of the vehicle, a radiator (20) assembled to the radiator support (10), and a hood (51) assembled to an upper side of the front-end part of the vehicle in such a manner as to be freely opened and closed, wherein a projecting portion (52) is provided on the hood (51) for applying to the upper member (11) a force to cause the radiator (20) to be dislocated from the radiator support (10) when an impact force is applied from a front side of the vehicle to the hood (51) to deform the hood (51).

Thus, as the rigidity of the radiator support (10), that is, the upper member (11) is reduced further at the time of collision than when the radiator (20) is assembled to the radiator support (10), an impact force applied to a pedestrian when hit by a vehicle can be absorbed sufficiently.

In addition, according to the present invention, a distal end portion of the projecting portion (52) adapted to be brought into contact with the upper member (11) at the time of collision is substantially at an acute angle.

Additionally, according to the present invention, the projecting portion (52) is provided so as to be brought into contact with the upper member (11) in such a manner as to surround the periphery of an attachment portion of the radiator (20) provided on the upper member (11) at the time of collision.

Incidentally, the above parenthesized reference numerals imparted to the respective means denote examples of corresponding relationships with specific means described in embodiments which will be described later on.

The present invention will be understood more sufficiently from the accompanying drawings and the following description of preferred embodiments of the present invention.

BRIEF DESCRIPTION OF THE DRAWINGS

In the drawings:

FIG. 1A is a perspective view showing a front-end structure of a vehicle according to a first embodiment of the present invention, FIG. 1B is a sectional view taken along the line $I_1$-$I_1$ in FIG. 1A, and FIG. 1C is a sectional view taken along the line $I_2$-$I_2$ in FIG. 1B.

FIG. 2A is a sectional view showing a front-end structure of a vehicle according to a second embodiment of the present invention, FIG. 2B is a top plan view of FIG. 2A, and FIG. 2C is a sectional view taken along the line II-II in FIG. 2A.

FIG. 3A is a front view showing a front-end structure of a vehicle according to a third embodiment of the present invention, and FIG. 3B is a sectional view taken along the line III-III in FIG. 3A.

FIG. 4A is a front view showing a front-end structure of a vehicle according to a fourth embodiment of the present invention, and FIG. 4B is a sectional view taken along the line IV-IV in FIG. 4A.

FIG. 5A is a perspective view showing a front-end structure of a vehicle according to a fifth embodiment of the present invention, and FIG. 5B is an enlarged view of a Z1 portion in FIG. 5A.

FIG. 6A is a sectional view showing a front-end structure of a vehicle according to a sixth embodiment of the present invention, and FIG. 6B is an enlarged view of a Z2 portion in FIG. 6A.

DESCRIPTION OF THE PREFERRED EMBODIMENTS

First Embodiment

Figure 7B:
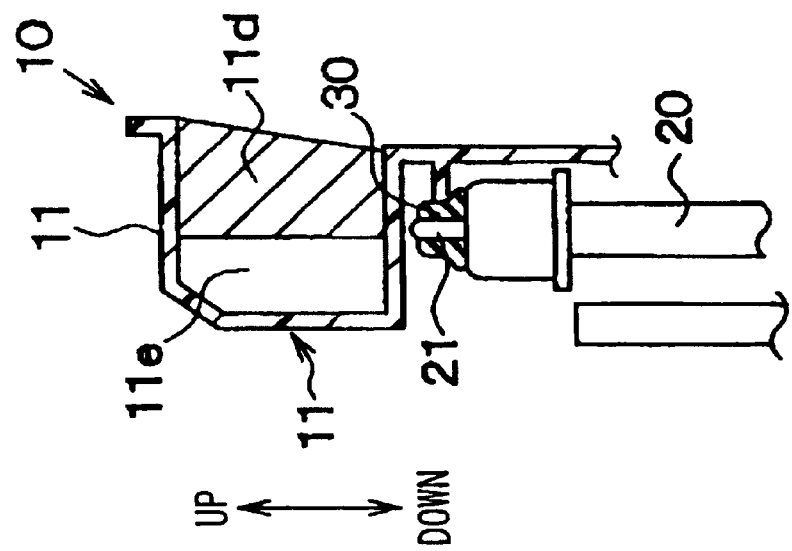
FIG. 7B is a sectional view taken along the line VII-VII in FIG. 7A.

FIG. 1A is a perspective view showing a front-end structure of a vehicle according to a first embodiment of the present invention, FIG. 1B is a sectional view taken along the line $I_1$-$I_1$ in FIG. 1A, and FIG. 1C a sectional view taken along the line $I_2$-$I_2$ in FIG. 1B.

A radiator support 10 is constructed to have a rectangular frame unit 14 including a beam-like upper member 11 extending in a transverse direction of a vehicle, a beam-like lower member 12 extending in the transverse direction of the vehicle below the upper member 11 and side members 13 extending vertically to connect longitudinal end portions of the upper member 11 with longitudinal end portions of the lower member 12 and fixing portions 15 for fixing the rectangular frame unit 14 to a vehicle body.

Note that in this embodiment, the radiator support 10 is formed from resin reinforced by carbon fibers or glass fibers as a one-piece unit.

In addition, a center brace 16 is a hood lock support which extends vertically to connect a substantially longitudinal center of the upper member 11 with a substantially longitudinal central portion of the lower member 12, a hood lock (not shown) for securing an engine hood is fixed to an upper end side of the center brace 16 or the substantially longitudinal center portion of the upper member 11.

In this respect, the center brace 16 and the hood lock are fixed to the radiator support 10 by a mechanical fastening means such as a bolt.

Then, a radiator 20 making up a heat exchanger for implementing heat exchanges between cooling water for a running engine and air is installed in the rectangular frame unit 14, and the radiator 20 is fixed to the radiator support 10 via a mount cushion 30 which is made up of a resiliently deformable material such as rubber.

As shown in FIG. 1B, to be specific, the mount cushion 30 is installed on an attachment pin 21 provided on the radiator 20, and the mount cushion 30 is then inserted and installed in an attachment hole 11b formed in a bracket portion 11a, which is integrated into the upper member at left and right two locations thereon.

As this occurs, as shown in FIG. 1C, the attachment hole 11b is formed into a shape of an elongated hole in such a manner that the longitudinal direction of the upper member 11 constitutes a longer diameter direction. In addition, an external shape of the mount cushion 30 is formed into a shape of an elongated hole which is substantially similar to an external shape of the mount hole 11b so that the longitudinal direction of the upper member 11 coincides with a longer diameter direction, and a crescent-like hole 31 is provided on either side of the attachment pin 21 in the longer diameter direction in such a manner as to hold the attachment pin 21 therebetween.

It should be noted that the hole 31 results when part of the mount cushion 30 is removed, and this hole 31 makes up a deformation promoting portion for promoting a facilitated deformation of the mount cushion 30 in the longer diameter direction.

Next, characteristics of the embodiment will be described.

Since when an impact force is applied to the upper member 11 from a front side of the vehicle, conventionally, the radiator 20 and the radiator support 10 (in particular, the upper member 11) attempt to deform together to be bent substantially into a V-shape so that they become convex toward the rear, the bending rigidity to the impact force is high and the radiator 20 and the radiator support 10 are difficult to deform. Due to this, in the conventional structure, the impact force cannot be absorbed sufficiently, and when the weak such as a pedestrian is hit, there was a high risk that a large damage would be done to the weak side.

In contrast to this, according to the embodiment, since the mount cushion 30 can deform easily in the longer diameter direction, the attachment portion between the upper member 11 and the radiator 20 can be displaced relative to the longitudinal direction of the upper member 11 when an impact force is applied to the upper member 11.

The hole in which the radiator pin 21 is inserted is provided in the mount cushion 30 which is an elliptic rubber bush as shown in FIG. 1C at a center thereof, and the mount cushion 30 constitutes a radiator support portion 21, the crescent-like hole 31 which is a space portion being provided at each end of the hole.

In the event that a force is applied to the radiator support portion 21 in the longitudinal direction of the upper member, the space portions 31 are deformed, and the radiator support portion 21 can easily be displaced.

In the event that an impact force is applied to the upper member 11 from the front of the vehicle, as the upper member attempts to be displaced to take a shape which flexes rearward, a tension is generated in the longitudinal direction in the upper member itself. As the radiator support portion 21 exists on the upper member 11, the rigidity of the radiator acts as a reaction force in such a manner as to oppose the tension so applied to the upper member, and as a result, the rearward flexure of the upper member 11 is interrupted.

In the present invention, the reaction force deriving from the radiator rigidity is absorbed by the space portions 31, whereby the rearward flexure of the upper member 11 can be facilitated.

Consequently, when an impact force is applied to the upper member 11 from the front side of the vehicle, as it is not the radiator 20 and the upper member 11 that are deformed together, but the upper member 11 that is deformed prior to the radiator 20, the bending rigidity to an impact force becomes smaller than the conventional structure.

As this occurs, as most of the force acting on the hood lock from the engine hood is applied to the upper member 11 vertically, whereas most of the impact force is applied to the upper member 11 horizontally, the upper member 11 can easily be deformed at the time of collision without largely reducing the mechanical strength of the upper member 11, whereby compatibility between the requirements of protection of pedestrians and sufficient strength of the upper member 11 can be ensured.

Second Embodiment

This embodiment is constructed such that a bracket 17 for holding an upper end side of a radiator 20 at a position which deviates, as shown in FIG. 2A, toward the front of the vehicle relative to an upper member 11 is provided at two left and right locations on a radiator support 10 and that external shapes of an attachment hole 17a in which a mount cushion 30 is inserted for installation and the mount cushion 30 are made circular as viewed from the top, as shown in FIG. 2C.

This embodiment is a separate embodiment from the embodiment shown in FIGS. 1A to 1C, but the embodiment provides a method for facilitating the rearward flexure of the upper member 11, an object thereof being the same as that of the first embodiment.

While the embodiment shown in FIGS. 1A to C is the example in which the longitudinal movement is allowed for by the elliptic bush, the second embodiment is an example in which a radiator support portion 21 is disposed at each end of the upper member 11, and furthermore, the mount cushion 30, which is a bush, is made circular, so that the upper member 11 rotates about the bush 30 when the upper member 11 flexes rearward, whereby the rearward flexure is facilitated.

Next, the function and advantage of the embodiment will be described.

In this embodiment, since the upper end side of the radiator 20 is held at the position which deviates in the longitudinal direction of the vehicle relative to the upper member 11, the upper member 11 constitutes a portal rigid frame construction (refer to FIG. 2B), as viewed from the top, relative to the radiator 20.

In contrast to this, in the conventional structure, as the attachment portion of the radiator does not deviate in the longitudinal direction of the vehicle relative to the upper member, the radiator and the upper member constitute a single simple beam construction as viewed from the top.

Consequently, since this embodiment flexes considerably and deforms when an impact force is imparted when compared with the conventional structure, or the bending rigidity to an impact force becomes small when compared with the conventional structure, the upper member 11 is allowed to be deformed easily at the time of collision without largely reducing the mechanical strength of the upper member 11. Thus, compatibility between the requirements of protection of pedestrians and sufficient strength of the upper member 11 can be ensured.

In addition, since the external shapes of the attachment hole 17a in which the mount cushion 30 is inserted for installation and the mount cushion 30 are made circular as viewed from the top, as shown in FIG. 2C, when the upper member 11 is deformed, the radiator 20 and the radiator support 10 or the attachment portion of the bracket 17 is able to rotate easily, and the bending rigidity to an impact force can be reduced in an ensured fashion when compared with the conventional structure.

Third Embodiment

This embodiment is constructed such that an upper side of a radiator 20 is held, as shown in FIGS. 3A, 3B, by brackets 18 provided on side members 13 and that an opening shape of an attachment hole 18a formed in the bracket portion 18 in which a mount cushion 30 is inserted for installation and an external shape of the mount cushion 30 are made, as shown in FIG. 3B, circular as viewed from the top.

Next, the function and advantage of the embodiment will be described.

In this embodiment, since the upper side of the radiator 20 is held not at the upper member 11 but at the side members 13, the upper member 11 and the radiator 20 do not deform together, and the bending rigidity to an impact force is substantially made up of the bending rigidity of the upper member 11 alone.

Consequently, since the bending rigidity to an impact force becomes small when compared with the conventional structure, the upper member 11 is allowed to be deformed easily at the time of collision without largely reducing the mechanical strength of the upper member 11, whereby compatibility between the requirements of protection of pedestrians and sufficient strength of the upper member 11 can be ensured.

In addition, as the opening shape of the attachment hole 18a and the external shape of the mount cushion 30 are made circular as viewed from the top, as with the second embodiment, the radiator 20 and the radiator support 10, that is, the attachment portion to the bracket 17, can easily rotate, whereby the bending rigidity to an impact force can be reduced in an ensured fashion when compared with the conventional structure.

Fourth Embodiment

This embodiment is constructed, as shown in FIGS. 4A, 4B, such that a bracket 19 is provided which holds an upper end side of a radiator 20 at a position which deviates toward the rear of the vehicle relative to an upper member 11 and that a center brace 16 is attached to the upper member 11 in such a manner as to transmit to the bracket 19 a force which rotates and displaces the bracket upwardly when receiving an impact force from the front side.

By this structure, when the center brace 16 is deformed when receiving an impact force, as shown in FIG. 4B, the held condition on the upper end side of the radiator 20 is released, whereby the bending rigidity to an impact force is reduced when compared with the conventional structure.

Consequently, as the upper member 11 is easily deformed at the time of collision without largely reducing the mechanical strength of the upper member, the compatibility of the protection of a pedestrian and the securement of a strength required for the upper member can be attained.

Fifth Embodiment

This embodiment is constructed, as shown in FIGS. 5A, 5B, such that an elongated hole 16a having a longer diameter dimension is provided vertically on a lower end side of a center brace 16, that the lower end side of the center brace 16 is fixed to a lower member 12 by inserting a bolt 16b in an upper end side of the elongated hole 16a, and that a projecting portion 16c which partitions the elongated hole 16a in a longer diameter direction is provided in the center brace 16.

By this structure, when an impact force is applied to the center brace 16, the projecting portion 16c is collapsed and the bolt 16b moves to the lower end side relative to the elongated hole 16a, whereby a distance between the upper member 11 and the lower member 12 can be extended at the time of collision. In other words, the elongated hole 16a and the projecting portion 16c function as an extension permissive portion which permits the extension of the distance between the upper member 11 and the lower member 12 when an external force equal to or larger than a predetermined magnitude is applied.

Consequently, since the upper member 11 is easily deformed in a colliding direction without largely reducing the mechanical strength of the upper member 11 at the time of collision, the compatibility of the protection of a pedestrian and the securement of a required strength for the upper member 11 can be attained.

Sixth Embodiment

This embodiment relates to a case where a shroud 41 is formed to be integrated into a radiator support 10, as shown in FIG. 6A.

Then, as shown in FIG. 6B, in this embodiment, the thickness of a connecting portion A between an upper member 11 and the shroud 41 is made thinner than those of the other locations so as to reduce the mechanical strength of the connecting portion A when compared with the other locations.

Note that as is know, the shroud 41 is intended to cover a gap between a radiator 20 and a blower 40 so as to prevent an air flow induced by the blower 40 from bypassing he radiator 20 to flow, and that in this embodiment, the blower 40 is fixed to the radiator support 10 via the shroud 41.

Consequently, as the upper member 11 is allowed to be deformed easily in a colliding direction without largely reducing the mechanical strength of the upper member 11 at the time of collision, the compatibility of the protection of a pedestrian and the securement of a required strength for the upper member 11 can be attained.

Seventh Embodiment

This embodiment is constructed such that a bending rigidity reducing structure for reducing a horizontal bending rigidity of an upper member 11 and a bending rigidity enhancing portion for enhancing a vertical bending rigidity of the upper member are provided.

Figure 7A:
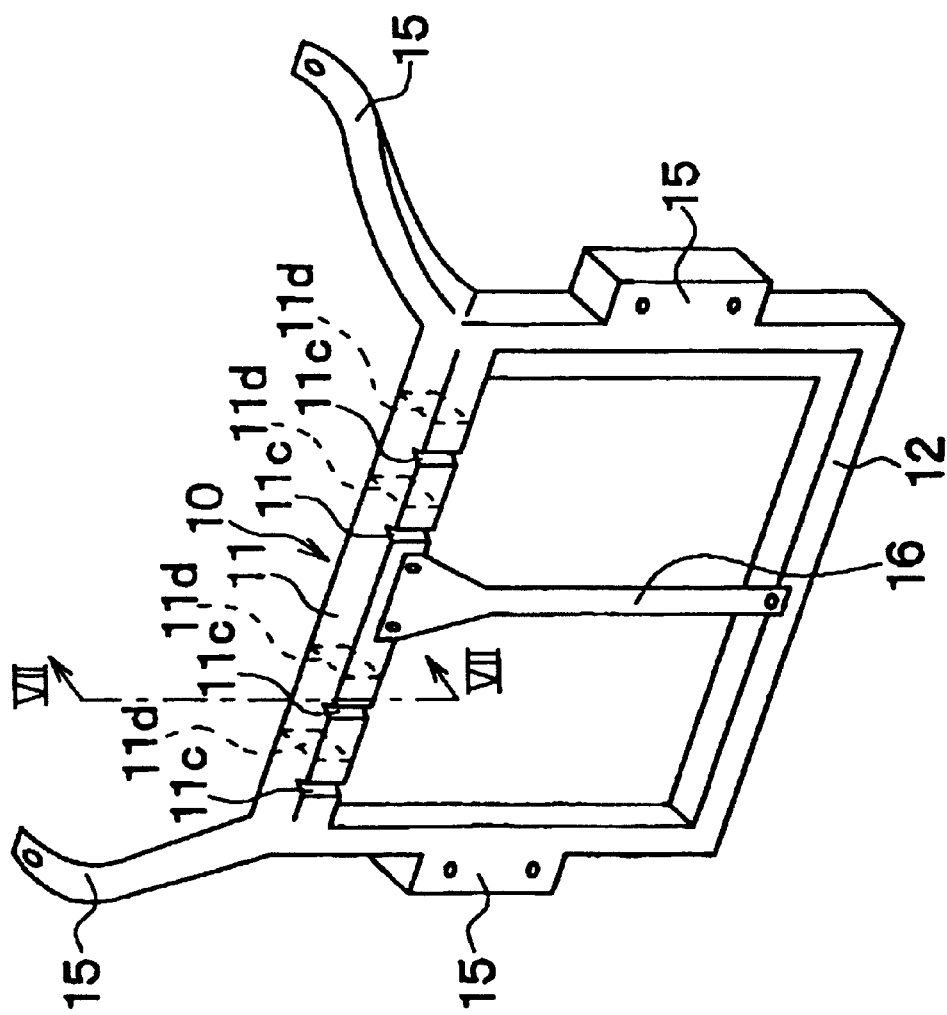
FIG. 7A is a perspective view showing a front-end structure of a vehicle according to a seventh embodiment of the present invention.

To be specific, as shown in FIG. 7A, notched portions 11c are provided in a vehicle front side of the upper member 11, and as shown in FIG. 7B, stiffeners 11d as wall-like connecting members which connect an upper side interior wall and a lower side interior wall of the upper member 11 are provided in such a manner as to extend in the interior of the upper member 11 from a location which deviates a predetermined dimension to the rear of the vehicle from a front-end portion of the vehicle toward the rear of the vehicle.

Namely, in this embodiment, the notched portions 11c and spaces 11e formed in front of the stiffeners 11d function as the bending rigidity reducing structure and the stiffeners 11d function as the bending rigidity enhancing structure.

Next, the function and advantage of the embodiment will be described.

As has been described above, since most of the force applied to the hood lock from the engine hood is applied vertically to the upper member 11, whereas most of the impact force is applied horizontally to the upper member 11, as in the case of this embodiment, the upper member 11 is allowed to be deformed easily in a colliding direction without largely reducing the mechanical strength of the upper member 11 at the time of collision by providing the bending rigidity reducing structure for reducing the horizontal bending rigidity of the upper member 11 and the bending rigidity enhancing structure for enhancing the vertical bending rigidity of the upper member 11, whereby the compatibility of the protection of a pedestrian and the securement of a required strength for the upper member 11 can be attained.

Eighth Embodiment

This embodiment is a modified example to the seventh embodiment.

Figure 8A:
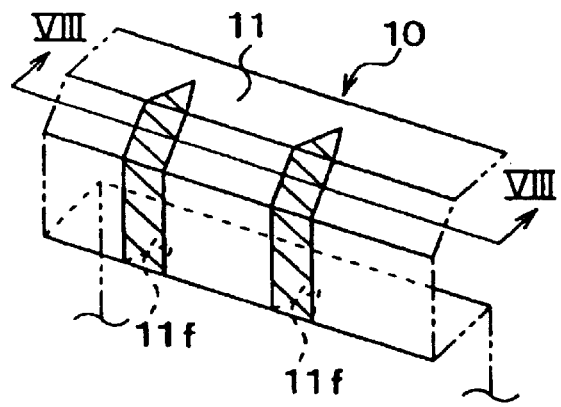
FIG. 8A is a perspective view showing the construction of an upper member according to an eighth embodiment of the present invention.
Figure 8B:
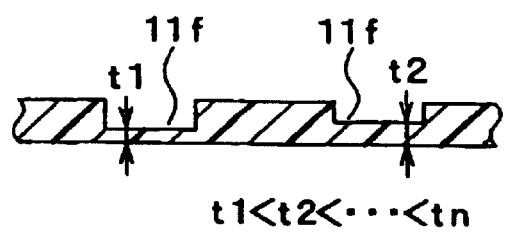
FIG. 8B is a sectional view taken along the line VIII-VIII in FIG. 8A.

To be specific, as shown in FIGS. 8A, 8B, this embodiment is constructed such that an upper member 11 is constructed into a structure which is similar to the conventional structure which is open on a side facing the rear of the vehicle so as to be formed into a U-shape to deal with the vertical bending rigidity of the upper member 11 and that thinner portions 11f having a thinner thickness than those of the other locations are provided so as to form a rigidity reducing structure.

Note that the thickness of the thinner portions 11f is selected such that the thickness becomes thinner as it approaches a substantially longitudinal center of the upper member 11 and thicker as it approaches end portions thereof.

By way of this structure, since the upper member 11 is easily deformed in a colliding direction without significantly reducing the mechanical strength of the upper member 11 at the time of collision, the compatibility of the protection of a pedestrian and the securement of a required strength for the upper member 11 can be attained.

Figure 9:
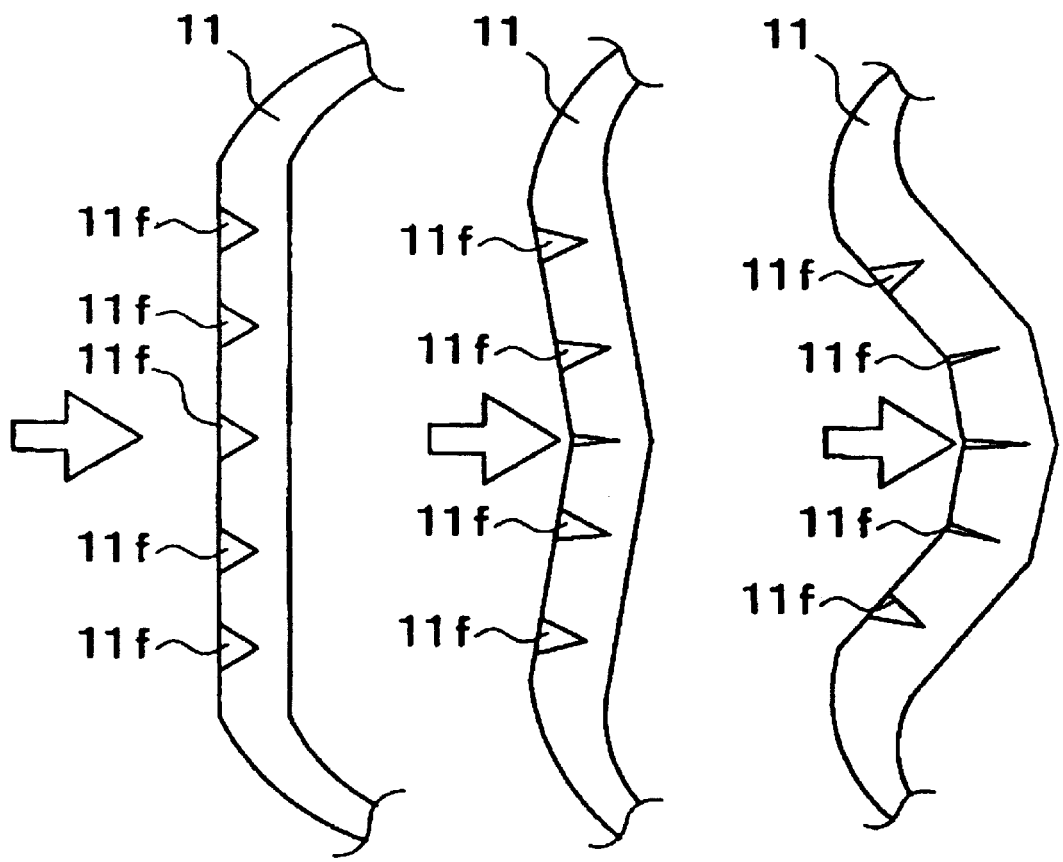
FIG. 9 is an explanatory view showing modified states of the upper member according to the eighth embodiment of the present invention.

Note that FIG. 9 shows a deforming process of the upper member 11 when an impact force is applied, and according to this embodiment, since the thickness of the thinner portions 11f is selected such that the thickness becomes thinner as it approaches the substantially longitudinal center of the upper member whereas the thickness becomes thicker as it approaches the end portions thereof, the upper member is allowed to be deformed substantially into a V shape without being forced so as to absorb the impact force.

Ninth Embodiment

Figure 10:
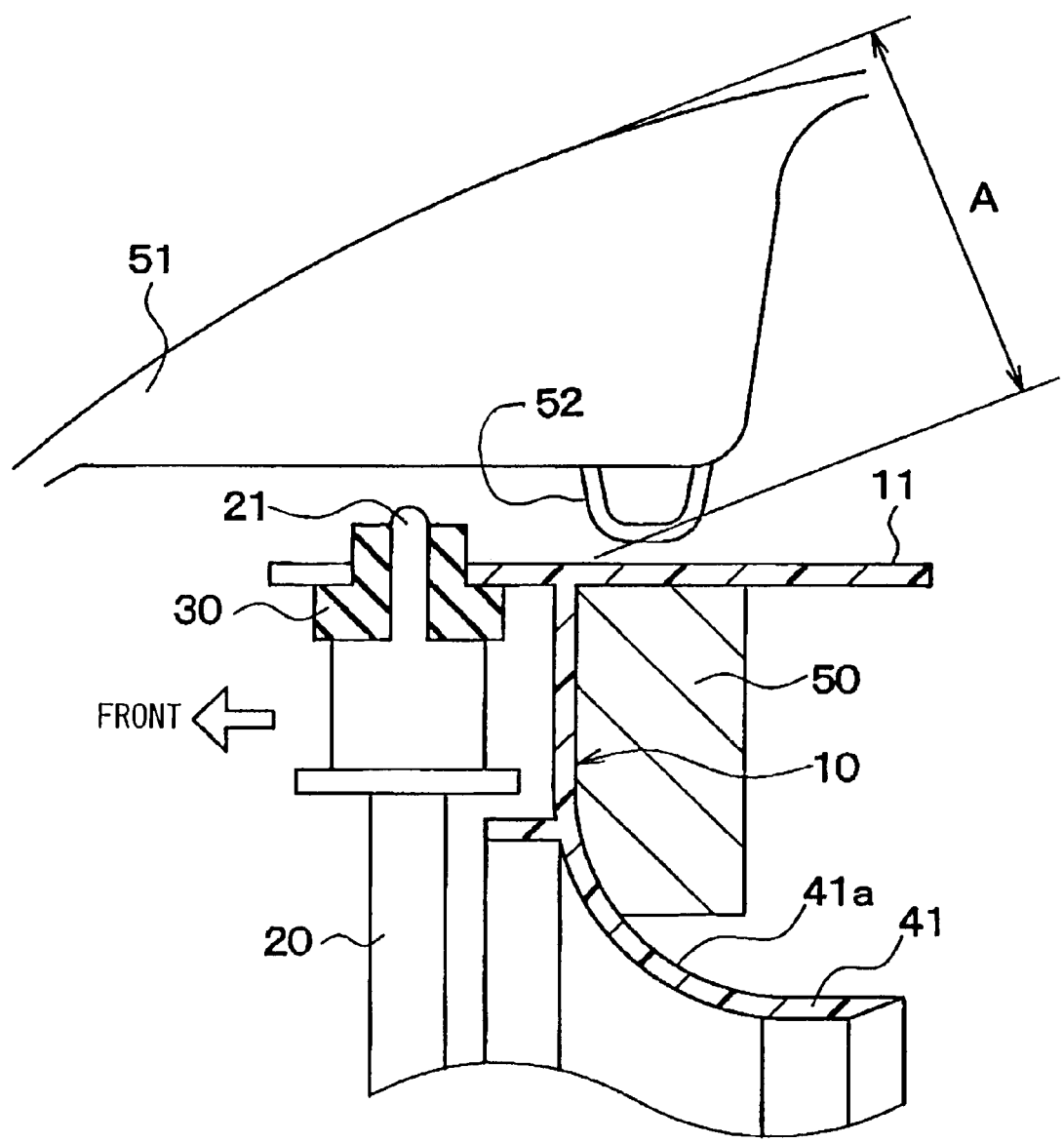
FIG. 10 is a sectional view showing the construction of an upper member according to a ninth embodiment of the present invention.

This embodiment is constructed such that an upper member 11 and a shroud 41 are formed from a resin to be integrated with each other and that as shown in FIG. 10, the upper member 11 is positioned rearward of a radiator 20 to the rear of the vehicle. In this respect, the material of a radiator support 10 is identical to that of the above-mentioned embodiments.

Figure 11:
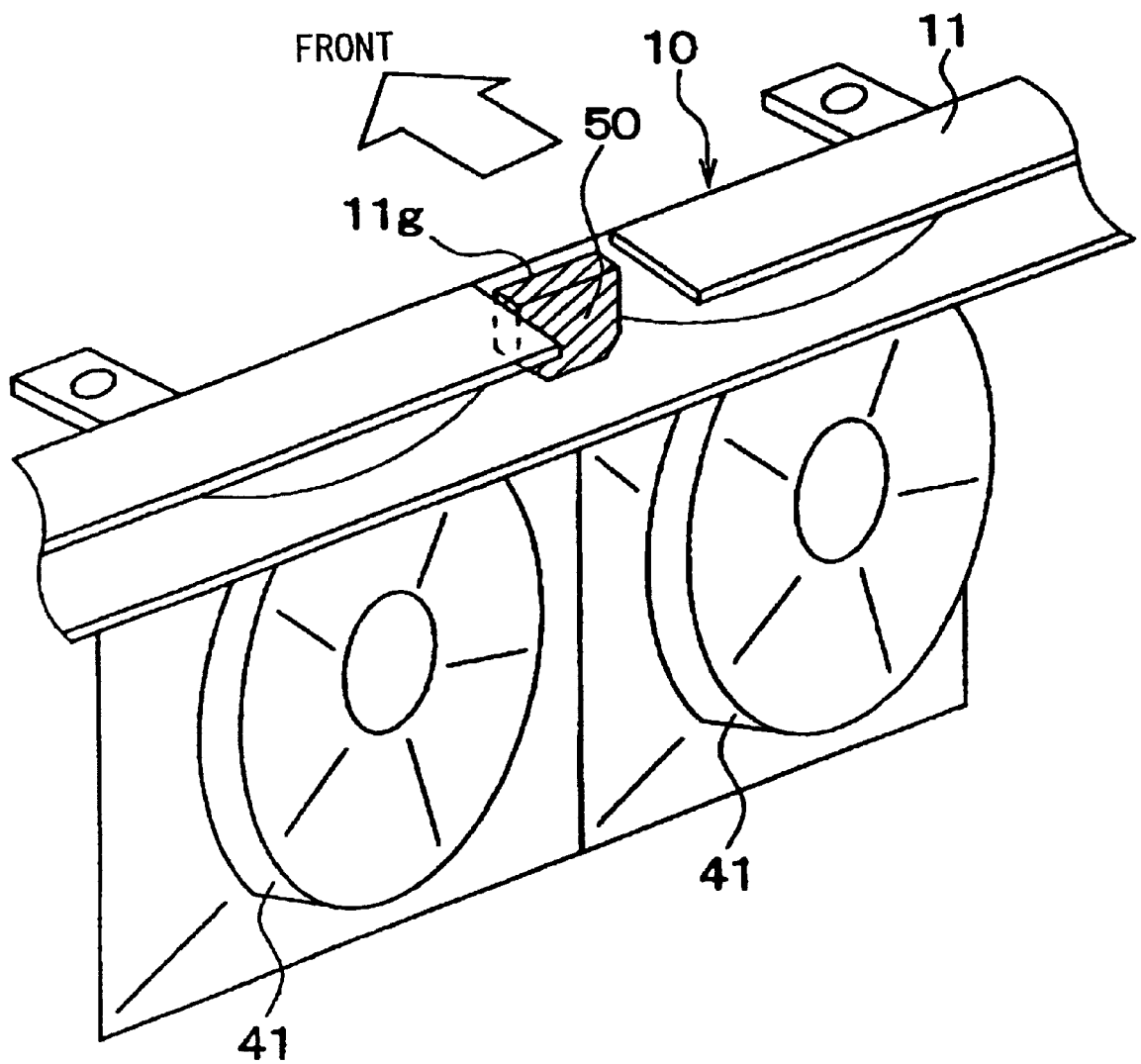
FIG. 11 is a perspective view showing the construction of the upper member according to the ninth embodiment of the present invention.

Then, the upper member 11 is formed so as to have a U-shaped cross section which is open on a rear side thereof by making use of an annular portion 41a of the shroud 41, and as shown in FIG. 11, a notched portion 11g is formed by partially cutting away an upper portion of the upper member 11 so that a hood lock 50 and an engine hood are allowed to fit therein. Incidentally, the engine hood is a lid for a front-end part of the vehicle which is assembled to an upper side of the front-end part in such a manner as to be freely opened and closed, and since an engine is normally installed in the front-end part of the vehicle, the lid is called the engine hood. However, when used in this specification, the hood means a lid for the front-end part of the vehicle which is assembled to the upper side of the front-end part of the vehicle in such a manner as to be freely opened and closed regardless of whether or not the engine is installed in the front-end part of the vehicle.

Note that a reinforcement rib is provided around the periphery of the notched portion 11g so as to prevent a reduction in strength of the upper member 11 due to the notched portion 11g.

Next, the function and advantage of the embodiment will be described.

There is a means for absorbing an impact force by causing the engine hood 51 having a projection portion 52 to be deformed as one of means for relaxing an impact force applied to a pedestrian when he or she is hit by a vehicle, and in order to allow the means to function effectively, a dimension A shown in FIG. 10 needs to be made as large as possible so as to secure as much a deformation margin for the engine hood 51 as possible.

As this occurs, in order to increase the dimension A as much as possible in the event that the upper member 11 is disposed above and forward to the front of the vehicle of the radiator 20, since an external contour of the engine hood 51 needs to be positioned above and forward to the front of the vehicle of a state shown in FIG. 10, there may be caused a risk that the vehicle is enlarged in size.

In contrast to this, according to the embodiment, since the upper member 11 is constructed to be positioned rearward to the rear of the vehicle of the radiator 20, the dimension A can be secured sufficiently without calling for the enlargement of the vehicle in size, whereby an impact force applied to the pedestrian when he or she is hit by the vehicle can be absorbed sufficiently.

Since the hood lock 50 is provided on the upper member 11, the impact force is transmitted to the upper member 11 positioned rearward of the radiator 20. Consequently, since the deformation of the upper member 11 is increased when compared with the case where the impact force is received by both the radiator 20 and the upper member 11, a sufficient collapsible margin which absorbs an impact force applied to the pedestrian when he or she is hit by the vehicle can be secured, whereby the compatibility of the protection of the pedestrian and the securement of the required strength for the upper member can be attained.

Tenth Embodiment

Figure 12:
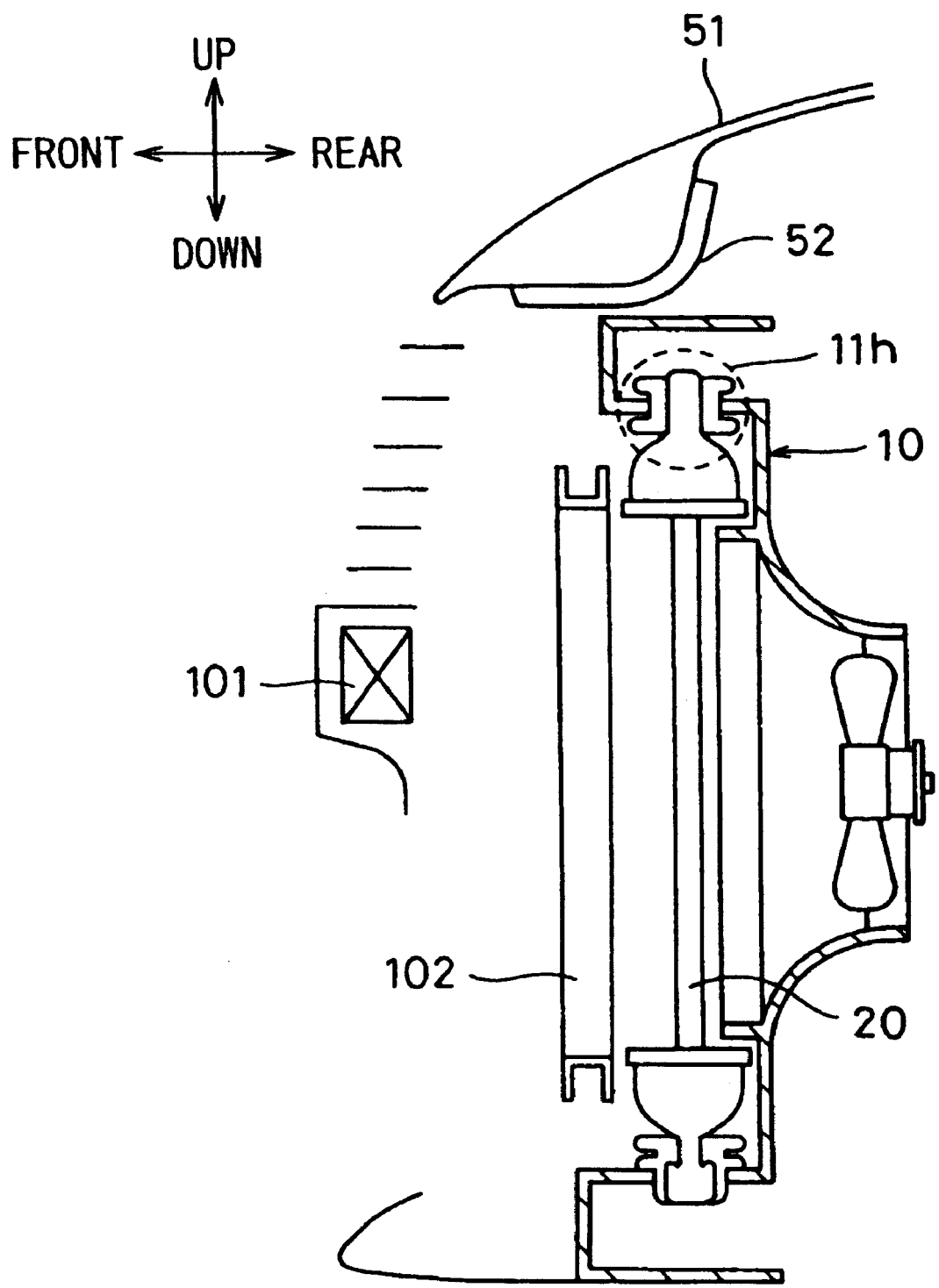
FIG. 12 is an explanatory view of a front-end structure of a vehicle according to a tenth embodiment of the present invention.

As shown in FIG. 12, this embodiment is constructed such that a projecting portion 52 is provided on an engine hood 51 which can apply to an upper member 11 a force which causes a radiator 20 to be dislocated from a radiator support 10 when an impact force is applied to the engine hood 51 from the front side of the vehicle to thereby deform the engine hood 51.

Note that in FIG. 12, a bumper reinforcement 101 is something like a beam which extends in the transverse direction of the vehicle at the front thereof so as to protect a front end of the vehicle, and a condenser 102 is an external heat exchanger of an automotive air conditioner.

Figure 13:
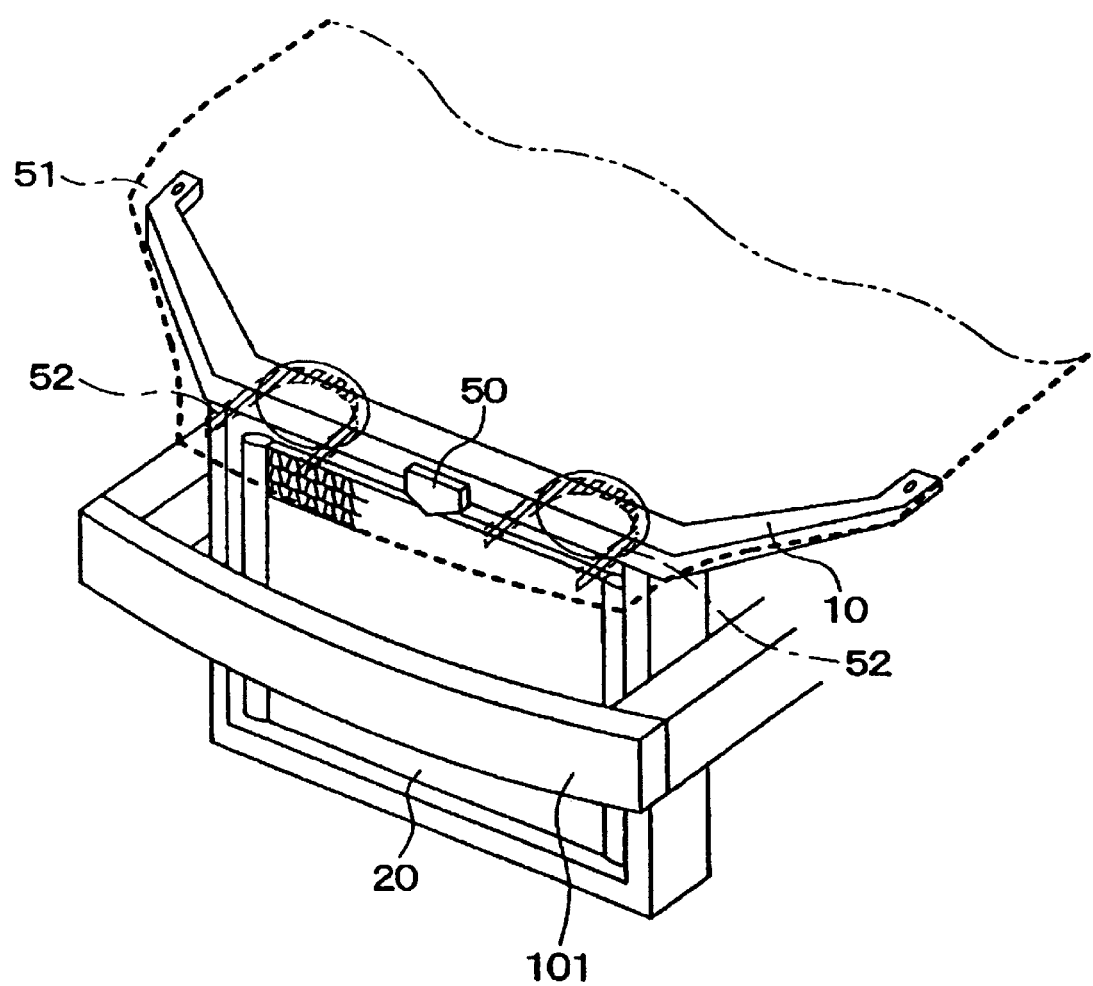
FIG. 13 is an explanatory view of the front-end structure of a vehicle according to the tenth embodiment of the present invention.

To be specific, a distal end portion of the projecting portion 52 which is brought into contact with the upper member 11 at the time of collision is formed into a shape pointed at an acute angle, and as shown in FIG. 13, the projecting portion 52 is formed substantially into a U-shape such that the projecting portion 52 is brought into contact with the upper member 11 in such a manner that the projecting portion 52 surrounds the periphery of an attachment portion 11h of the radiator 20 provided on the upper member 11 at the time of collision.

Next, the function and advantage of the embodiment will be described.

Figure 14:
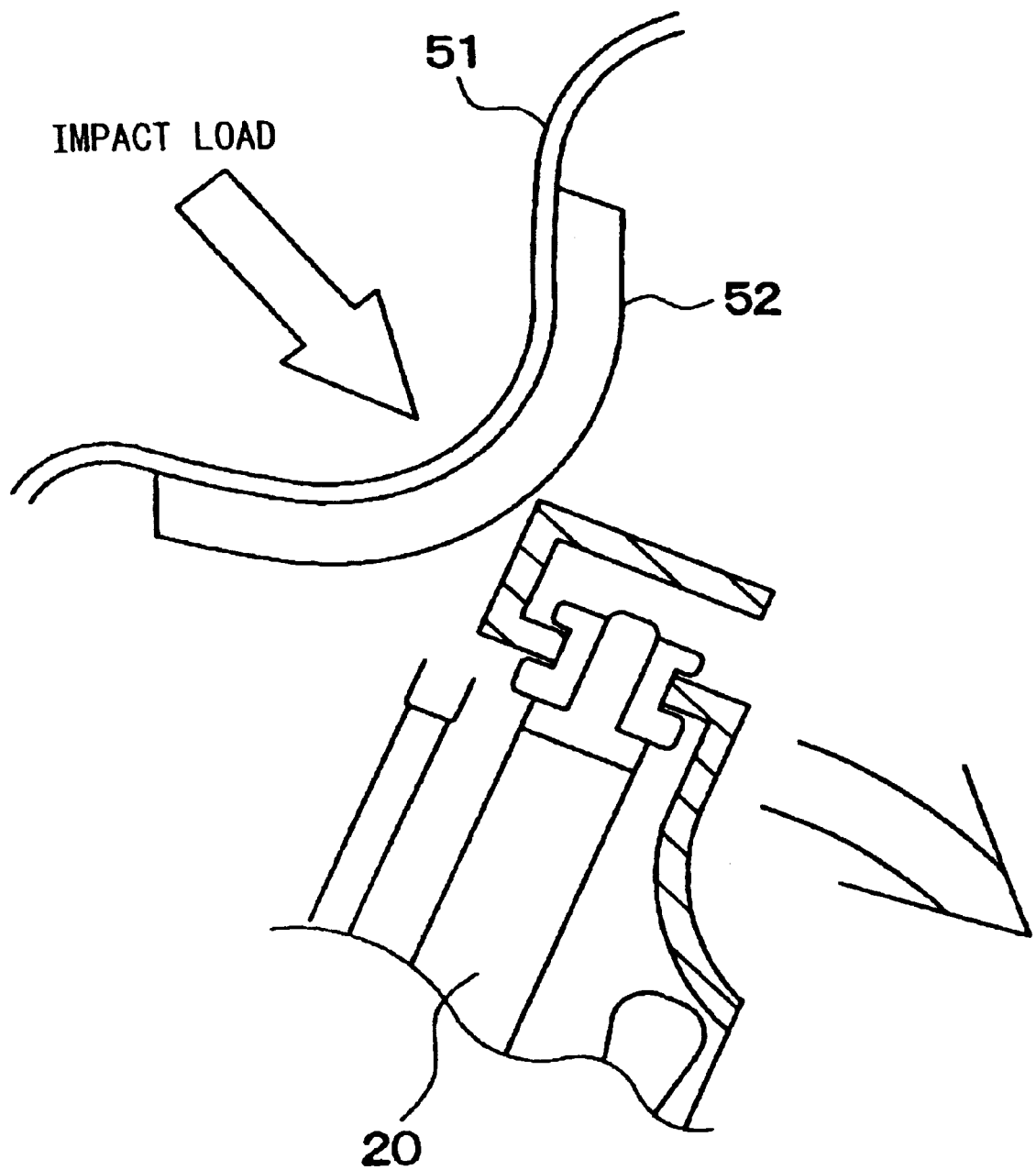
FIG. 14 is an explanatory view of the front-end structure of a vehicle according to the tenth embodiment of the present invention.
Figure 15:
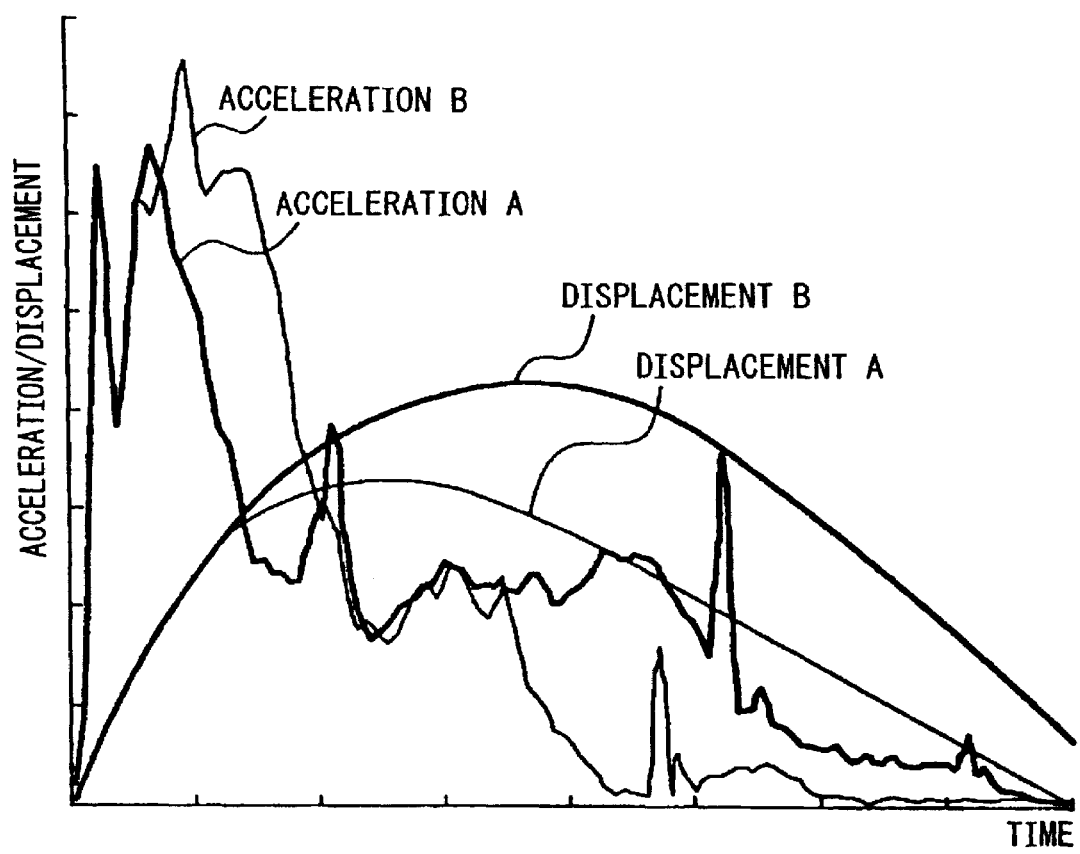
FIG. 15 is a graph showing displacements and accelerations of a head of a pedestrian resulting when the pedestrian is hit by a vehicle.

When an impact force is applied to the engine hood 51, as shown in FIG. 14, the projecting portion 52 comes into contact with the upper member 11 to thereby apply to the upper member a pressing force which breaks (cuts) the periphery of the radiator attachment portion of the upper member 11.

Due to this, as the radiator attachment portion 11h of the upper member 11 is detached from the upper member 11, there is produced a state in which the radiator 20 is dislocated from the radiator support 10.

Consequently, since the rigidity of the radiator support 10, that is, the upper member 11 is reduced lower than when the radiator 20 is assembled to the radiator support 10, an impact force that is applied to a pedestrian when he or she is hit by the vehicle can be absorbed sufficiently.

In addition, since the distal end portion of the projecting portion 52 is formed into the shape pointed at an acute angle, the radiator attachment portion can be detached from the upper member 11 in an ensured fashion, whereby an impact force that is applied to a pedestrian when hit by the vehicle can be absorbed sufficiently.

Incidentally, in order to cause the radiator 20 to be dislocated from the radiator support 10, while the projecting portion 52 may only have to be constructed so as to be brought into contact with the radiator attachment portion 11h at the time of collision, due to the variation in production of vehicle front-end components such as the radiator support 10 and the engine hood 51 and variation in application of impacts forces, it is difficult to bring the projecting portion 52 into contact (collision) with the radiator attachment portion in an ensured fashion at the time of collision.

In contrast to this, according to the embodiment, as the projecting portion 52 is constructed so as to collide against the upper member 11 in such a manner as to surround the periphery of the radiator attachment portion 11h at the time of collision, the radiator attachment portion 11h can be dislocated from the upper member 11 in the ensured fashion, whereby an impact force that is applied to a pedestrian when hit by the vehicle can be absorbed sufficiently.

Note that while the projecting portion 52 is formed into the U-shape in this embodiment, the embodiment is not limited to the shape, and the projecting portion 52 may be formed into an O-shapse.

In addition, while the radiator 20 is dislocated from the radiator support 10 by causing the radiator attachment portion to be detached from the upper member 11, the radiator attachment portion may be released by an impact force to the projecting portion 52 so that the radiator 20 can be dislocated from the radiator support 10 without breaking the upper member 11.

Other Embodiments

While in the first embodiment, the hole 31 is provided in the mount cushion 30 so that the attachment portion between the upper member 11 and the radiator 20 can be displaced relative to the longitudinal direction of the upper member 11, the present invention is not limited to this, and a specific structure is not limited to the embodiment provided that there is provided a structure in which the attachment portion between the upper member 11 and the radiator 20 can move in parallel relative to the longitudinal direction of the upper member 11.

In addition, while in the second embodiment, the upper end side of the radiator 20 is caused to deviate to the front side relative to the upper member 11, the present invention is not limited to this, but the upper end side of the radiator 20 may be caused to deviate to the rear side relative to the upper member 11.

Additionally, while the radiator support 10 is formed from the resin which is reinforced by the carbon fibers or glass fibers to be integrated with each other in the first to eighth embodiments, the present invention is not limited to this, but the radiator support 10 may be fabricated by applying a die casting process or a pressing process to a metallic material such as aluminum or magnesium.

In addition, while the center brace 16 and the hood lock are fixed to the radiator support 10 with the mechanical fastening means such as the bolt in the above embodiments, the present invention is not limited to this, and the center brace 16 and the hood lock may be assembled to the radiator support 10 using welding and deposition.

The invention claimed is:

1. A front-end structure of a vehicle comprising:
    a beam-like upper member fixed to a vehicle body at a front-end part of the vehicle, the beam-like upper member extending in a transverse direction of the vehicle and having a radiator support, and
    a radiator assembled to the radiator support of the beam-like upper member, the radiator being supported by the beam-like upper member, wherein
    when an impact force is applied to a hood of the vehicle from a front side of the vehicle, the beam-like upper member is positioned with respect to the hood to be displaced prior to displacement of the radiator; and
    the radiator is disposed toward the front side of the vehicle in relation to the beam-like upper member.

2. A front-end structure of a vehicle as set forth in claim 1, wherein the beam-like upper member is positioned to be deformed toward a rear of the vehicle when the impact force is applied to the hood.

3. A front-end structure of a vehicle as set forth in claim 1, further comprising:
    a shroud constructed to cover a gap between a radiator and a blower so as to prevent an air flow induced by the blower from bypassing the radiator; wherein
    part of the shroud is part of the beam-like upper member, and a portion of the beam-like upper member to which the impact force is applied is disposed at a more rearward position of the vehicle than the radiator support; and
    the shroud and the beam-like upper member are disposed on the same side of the radiator.

4. A front end structure of a vehicle as set forth in claim 3, wherein the beam-like upper member and the shroud are formed from a resin to be integral with each other.

5. A front-end structure of a vehicle as set forth in claim 3, wherein a hood lock for securing an engine hood is provided on the beam-like upper member.

6. A front-end structure of a vehicle as set forth in claim 3, wherein the beam-like upper member is disposed at the same height as a portion of the radiator support holding the radiator.

7. A front-end structure of a vehicle as set forth in claim 3, wherein the hood has an external surface sloping upward from a front side of the vehicle to a rear side thereof.

8. A front-end structure of a vehicle as set forth in claim 3, wherein a portion of the beam-like upper member to which the front impact force is applied is disposed at a more rearward position than a rearward end of the radiator support.

9. A front-end structure of a vehicle as set forth in claim 3, wherein the front impact force is applied to a hood of the vehicle from a front side of the vehicle.

10. A front-end structure of a vehicle as set forth in claim 1, wherein the radiator support is disposed toward the front side of the vehicle in relation to the beam-like upper member.

11. A front-end structure of a vehicle as set forth in claim 1, wherein a hood lock for securing an engine hood is disposed toward a rear side of the vehicle in relation to the radiator.

12. A front-end structure of a vehicle as set forth in claim 1, wherein the upper member is disposed at a more rearward position of the vehicle than the radiator.

* * * * *